United States Patent
Veik et al.

(10) Patent No.: US 7,952,051 B2
(45) Date of Patent: May 31, 2011

(54) ELECTRONIC POLARITY REVERSING SWITCH FOR A MULTI-PROCESS WELDING POWER SOURCE

(75) Inventors: Brian James Veik, Neenah, WI (US);
Paul Verhagen, Appleton, WI (US);
Edward Beistle, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1070 days.

(21) Appl. No.: 11/740,169

(22) Filed: Apr. 25, 2007

(65) Prior Publication Data
US 2008/0035621 A1   Feb. 14, 2008

Related U.S. Application Data

(60) Provisional application No. 60/809,487, filed on May 31, 2006.

(51) Int. Cl.
*B23K 9/10* (2006.01)
(52) U.S. Cl. ............. 219/130.1; 219/130.5; 219/137 PS
(58) Field of Classification Search ............... 219/130.1, 219/130.51, 132, 137 PS
See application file for complete search history.

(56) References Cited

U.S. PATENT DOCUMENTS

| | | | | |
|---|---|---|---|---|
| 1,619,629 | A | * | 3/1927 | Owen .......................... 336/160 |
| 3,475,585 | A | * | 10/1969 | Pierce ........................ 219/130.1 |
| 3,566,072 | A | * | 2/1971 | Pierce ........................ 219/130.1 |
| 3,851,141 | A | | 11/1974 | Cooper |
| 5,171,967 | A | | 12/1992 | Schwiete |
| 5,406,050 | A | | 4/1995 | Macomber et al. |
| 2006/0289492 | A1 | | 12/2006 | Thomas |
| 2006/0289493 | A1 | | 12/2006 | Thomas |

FOREIGN PATENT DOCUMENTS

| | | | |
|---|---|---|---|
| EP | 1815 A1 | * | 5/1979 |
| JP | 56004380 A | * | 1/1981 |
| JP | 03297572 A | * | 12/1991 |

* cited by examiner

*Primary Examiner* — Stephen J Ralis
(74) *Attorney, Agent, or Firm* — Fletcher Yoder

(57) ABSTRACT

A system and method, in certain embodiments, sets an output polarity based on a selected process. The system and method may be used to operate a variety of equipment, such as welders, cutters, tools and so forth. In some embodiments, the system and method may include receiving an input signal and configuring circuitry to output power with a given polarity based on the input signal.

21 Claims, 9 Drawing Sheets

ELECTRONIC POLARITY REVERSING SWITCH FOR A MULTI-PROCESS WELDING POWER SOURCE

CROSS REFERENCE TO RELATED APPLICATION

This application claims priority to U.S. Provisional Application No. 60/809,487, filed on May 31, 2006, which is hereby incorporated by reference.

BACKGROUND

The invention relates generally to welding systems, and more particularly to an electronic polarity reversing switch for a multi-process welding power source.

Welding systems generally support different types of processes, including MIG welding (metal inert gas welding), TIG welding (tungsten inert gas welding), stick welding and the like. Generally, a welding system includes a single output connection and, thus, the welding system only supports a single process at a time. Welding systems typically include a single power source configured to output power capable of independently supporting each of these specific welding processes. Unlike a welding system that connects to only a single process at a time, multi-process welding systems may be configured to connect to multiple processes at the same time. Thus, a multi-process welding system may include a power source configured to output power based on the welding process being performed at that time.

Certain welding processes supported by a multi-process welding power sources require reversal of output polarity between DCEP (Direct Current Electrode Positive) and DCEN (Direct Current Electrode Negative). Accordingly, a power source may need to switch outputs between the two polarities. Switching between DCEP and DCEN generally includes a manual process to reverse the output polarity of a multi-process welding power source. Switches generally include a rotary type switch mounted proximate to the power source or separate process selector switches located remotely. Therefore, the user must not only understand which output polarity is appropriate for a given welding process, but the user must also physically reverse the switch. A switch proximate to the power source may require the user to return to the power source from the workpiece to change the polarity. The distance between the workpiece and the power source can be significant and require an increased amount of time and effort to make the change. A separate process selector switch may allow for switching from a remote location, however, this method requires an additional apparatus and complicates connection of the weld output control cables.

BRIEF DESCRIPTION

In certain embodiments, a multi-process power supply includes outputs configured to provide power at multiple polarities. For example, in one embodiment, a system includes a multi-process power supply, including a control circuit configured to enable output of power at a first polarity, a second polarity opposite from the first polarity or a combination thereof, based on a desired process selected from a plurality of different processes.

In accordance with another embodiment, a system includes, a power circuit comprising switches configured to route an input power, a first output configured to provide an output power comprising a first polarity, a second output configured to provide an output power comprising a second polarity. The system also includes a control circuit coupled to the power circuit and configured to provide a switch control signal to a switch such that power is output on the first or second output with a polarity controlled automatically in response to an input control signal representative of a welding process, a cutting process, or a combination thereof.

In accordance with yet another embodiment, a method for providing power includes receiving a power, receiving a signal indicative of a welding process, or a cutting process, determining an output polarity based on the signal, transmitting a control signal to switches based on the output polarity and routing the power to an output configured to output the power with the output polarity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in greater detail below, various welding systems are integrated together in a single multi-process power supply. For example, welding torches, cutting torches or other welding devices may all be coupled to a multi-process power supply, wherein each welding device can receive an output polarity (e.g., DCEP or DCEN) used by each of the processes performed by the respective devices. The multi-process power supply may include a shared power source that is configured to output multiple forms of power used by each of the welding systems. As discussed below, some embodiments of the shared power source include power circuitry comprising switches and rectifiers configured to receive and route the power to the appropriate outputs of the shared power source. In some embodiment, the power source includes a control circuit to automatically control switches to configure the output polarity of the power circuitry based on the process and/or device being used. In some embodiments, the control circuit may automatically remove power from the unused electrical connections (e.g., the output studs) of the power source. Further, embodiments may comprise multiple forms of transformers (e.g., center-tapped transformers and single secondary winding transformers) operating in reverse or forward biased modes.

Figure 1:
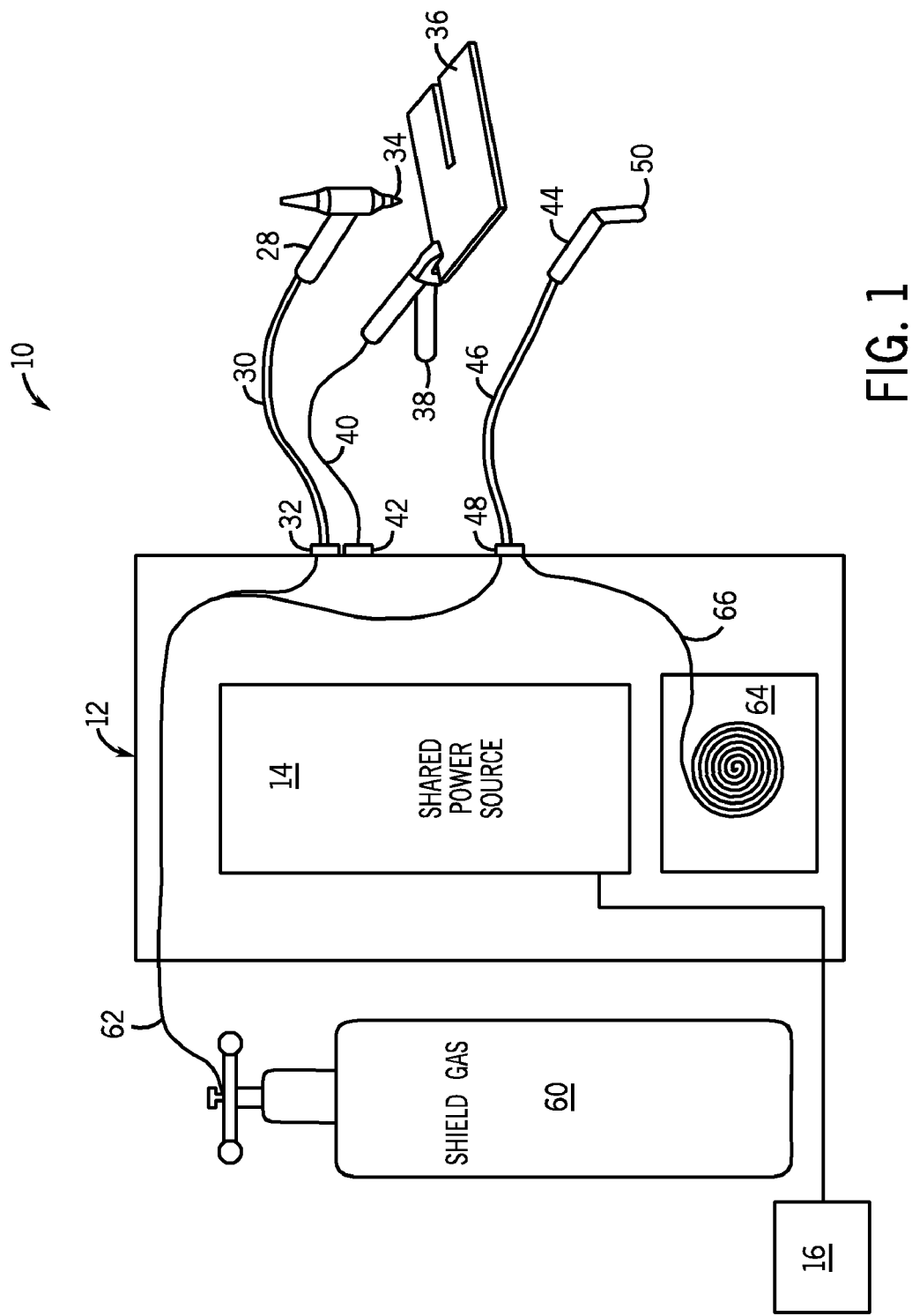
FIG. 1 is a diagram of an exemplary system having a multi-source power supply in accordance with certain embodiments of the present technique.

FIG. 1 is a diagram of an exemplary system 10 having a multi-process power supply 12 in accordance with certain embodiments of the present technique. As illustrated, the welding power supply 12 includes a shared power source 14, which is configured to supply power to a plurality of different welding devices connected to the power supply 12 and/or the shared power source 14 simultaneously.

Figure 2:
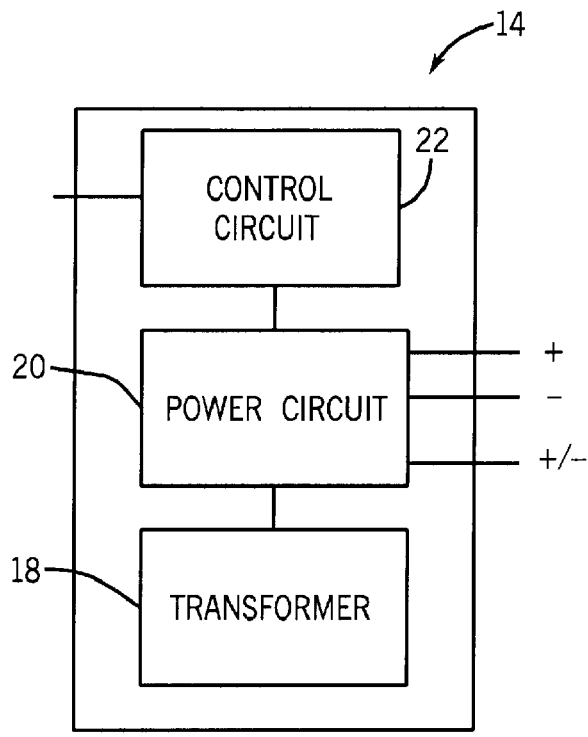
FIG. 2 is a diagram of an exemplary shared power source of FIG. 1 in accordance with certain embodiments of the present technique.

Generally, the welding power supply 12 may receive an input power from an alternating current power source 16, such as an AC power grid, and provide the input power to the shared power source 14. The shared power source 14 may condition the input power and provide an output power in accordance with the demands of the system 10. As depicted, in FIG. 2, the shared power source 14 includes a transformer 18, power circuitry 20 and a control circuit 22. The power from the power source 16 is input to the shared power source 14 via the transformer 18. The transformer 18 may receive the input power via a primary winding and condition the power via a secondary winding that is coupled to the power circuitry 20. In some embodiments, the transformer 18 may include a plurality of elements and configurations. For example, as will be discussed in greater detail below with regard to FIGS. 4-8, the transformer 18 may comprise a center-tapped transformer 16 having two secondary windings configured to operate as forward-biased or reverse-biased. Further, in other embodiments that are discussed in greater detail below with regard to FIGS. 9 and 10, the transformer 18 may comprise a single secondary winding that is configured to operate as forward-biased or reverse-biased. In addition, as depicted in FIGS. 4-10, the shared power source 14 may include an additional secondary winding coupled to a boost output control circuit 23 coupled to the power circuitry 20. The boost output control circuit 23 may provide additional power to the power circuit 20 if demanded by the connected devices and the respective processes.

The output of the transformer 18 may be routed via the power circuitry 20 to outputs of the shared power source 14. In some embodiments, the power circuitry 20 may include a variety of devices and configurations to route the power to outputs of the shared power source 14 and the welding power supply 12. For example, as is discussed in greater detail below with regard to FIGS. 4-10, the power circuitry 20 includes rectifiers and switches configured to route the power from the transformer 18 to a DCEP output or a DCEN output of the shared power source 14. In some embodiments, the control circuit 22 may open or close the switches to route power based on a process being performed.

The power output from the power circuitry 20 of the shared power source 14 may be provided to devices coupled to the welding power supply 12. For example, as illustrated in FIG. 1, a TIG welding torch 28 and supply cable 30 are coupled to a connector 32 on the face of the welding power supply 12. The connector 32 may include an electrical connection configured to electrically couple an output of the shared power source 14 (e.g., an output stud) to an electrical conductor within the supply cable 30. The electrical conductor within the supply cable 30 may provide an electrically conductive path to route power from the connector to an electrode 34 disposed within the TIG welding torch 28. To initiate a weld, a user may position the electrode 34 proximate to a workpiece 36 and provide a signal (e.g., a trigger signal) to the welding power supply 12 and/or the shared power source 14 to provide a current output. A current loop may be formed via the connector 32, the supply cable 30, the electrode 34, the workpiece 36, a work clamp 38 and a cable 40 that is electrically coupled to a connector 42 on the face of the welding power supply 12. The connector 42 includes an electrical connection configured to electrically couple the cable 40 to an output of the shared power source 14 (e.g., a work output stud) to complete the current path. As will be appreciated, the current flow creates an electric arc between the electrode 34 and the workpiece 36. The electric arc generates heat that melts the workpiece 36 to create a weld.

Similarly, power may be supplied to another welding device coupled to the welding power supply 12. For example, as illustrated in FIG. 1, a MIG welding gun 44 and supply cable 46 are coupled to a connector 48 on the face of the welding power supply 12. The connector 48 includes an electrical connection configured to electrically couple an output of the shared power source 14 (e.g., an output stud) to an electrical conductor within the supply cable 46. The electrical conductor within the supply cable 46 provides an electrically conductive path to route power from the shared power source 14 to a consumable electrode 50 disposed within the MIG welding gun 44. To initiate a weld, a user may position the consumable electrode 50 proximate to the workpiece 36 and provide a signal (e.g., a trigger signal) to the welding power supply 12 and/or the shared power source 14 to provide a current output. A current loop may be formed via the connector 48, the supply cable 46, the consumable electrode 50, the workpiece 36, the work clamp 38 and the cable 40 that is electrically coupled to the connector 42 on the face of the welding power supply 12. As will be appreciated, the current flow creates an electric arc between the consumable electrode 50 and the workpiece 36. The electric arc generates heat that melts the workpiece 36 and the consumable electrode 50 to create a weld.

The welding power supply 12 may be configured to provide power to any number of welding devices (such as a TIG torch 28, MIG gun 44 and the like), cutting devices (e.g., plasma cutting torch), and so forth. For example, as described in further detail below, the power circuit 20 of the shared power source 14 may include circuitry configured to output current to multiple DCEP output studs and/or multiple DCEN output studs. In such a configuration, each of the output studs may be electrically coupled to a connection on the face of the power supply 12 in a similar configuration to the output connectors 32 and 48 depicted in FIG. 1. Accordingly, multiple devices may be connected to the power supply 12 at the multiple connectors. For example, if there are three DCEP connections and three DCEN connections, a TIG torch may be connected to each of the three DCEN connections, two MIG guns may be connected to two of the DCEP connections and a stick welding gun (stinger) may be coupled to the third DCEP connection. Any compatible welding, cutting or other device may be coupled to the connectors in any combination. For example, a plasma cutter may be attached to one of the connectors, and another connector may not even have a device connected to it.

As depicted, the welding power supply 12 includes connector 42 configured to couple to the cable 40 electrically coupled to the workpieces 36 via the workclamp 38. Therefore, a user may switch between using the TIG torch 28 to weld the workpiece 36 and, alternatively, welding with the MIG gun 44.

The welding system 10 may include a variety of other components used for welding operations. For example, as depicted in FIG. 1, the welding system 10 includes a shielding gas source 60 configured to provide a shielding gas to the welding devices (such as the TIG torch 28 and the MIG gun 44). As depicted the shielding gas is provided to the welding power supply 12 via a gas conduit 62 and routed via the welding power supply 12 to the supply cables 30 and 46 and the TIG torch 28 and MIG gun 44, respectively. Further, as depicted, the welding power supply 12 may include a wire feeder 64 configured to provide a welding wire 66 to the MIG gun 44 via the supply cable 46. The welding system 10 may include any variety of devices used by the processes supported by the welding power supply 12.

The remainder of this discussion focuses on embodiments of the shared power source 14. More specifically, the following embodiments consider systems and methods implemented with the shared power supply 14 to provide the required/requested power to outputs of the shared power source 14. These outputs are configured to supply power to the power supply 12 and/or connected welding devices.

Figure 3:
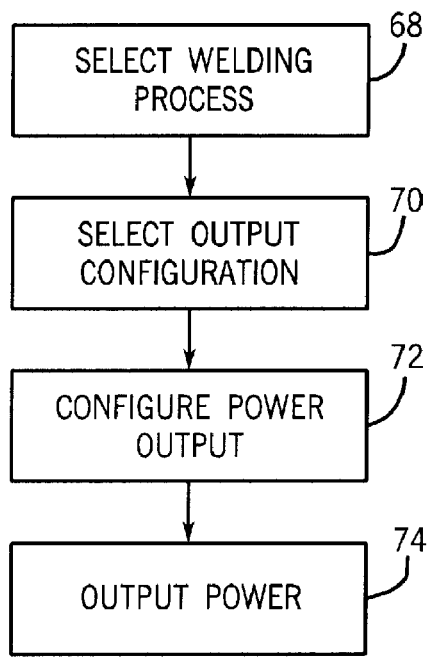
FIG. 3 is a flowchart illustrating an exemplary method of providing an output from the shared power source of FIG. 2 in accordance with embodiments of the present technique.

Turning now to FIG. 3, depicted is a flowchart illustrating a method for outputting power from the shared power source 14 in accordance with the requirements of the system 10, and more specifically in accordance with the requirements of the devices connected to power supply 12. As discussed above, the shared power source 14 may be contained within the power supply 12 and configured to output power with a given polarity based on a particular process being performed. For example, when performing MIG welding, the MIG gun 44 may be operated in a DCEP mode to increase the heat generated at the electrode 50 and/or to reduce burn through at the workpiece 36. However, when performing welding with another connected device, such as TIG welding, the TIG torch 28 may be operated in a DCEN mode to reduce the heat concentration at the electrode 34 and to increase the heat within the workpiece 36. Accordingly, a first step may include selecting a welding process, as depicted by block 68. In an embodiment, selecting the welding process may include providing an input signal indicative of the process and/or the desired output polarity to an input of the control circuit 22. For example, the control circuit 22 may include an input configured to receive a signal indicative of the output needed to perform the current process. An embodiment may include a switch on the welding device (such as the TIG torch 28 and the MIG gun 44) that transmits a signal to the control circuit 22 in response to its activation by an operator. In another embodiment, the user may simply pull a trigger on the given device (e.g., the TIG torch 28 or MIG gun 44) to initiate a weld and the control circuit 22 may recognize the demand as a request to select a process.

In response to the signal received, the control circuit 20 may select an output configuration, as depicted at block 70. For example, in a configuration where the shared power source 14 includes a single DCEP output and a single DCEN output, the control circuit 20 may interpret the control signal and determine if the shared power source 14 should provide power on the DCEP output or the DCEN output. Accordingly, the control circuit 20 may switch between DCEP and DCEN outputs based on interpretations of the control signal. In an embodiment where the shared power source 14 includes multiple DCEP outputs and multiple DCEN outputs, the control circuit 20 may also process the control signal to identify which specific output requires DCEP or DCEN power. For example, in a shared power source 14 that includes multiple DCEP and DCEN outputs (as discussed in further detail with regard to FIGS. 5 and 6), the control circuit may activate or deactivate additional switches within the power circuitry 20 to enable output on one of the output studs while disabling output on other output studs. Thus, after identifying the power output required/requested by the signal, the control circuit 22 may operate the switches to configure the output power, as depicted by block 72. With the power circuit 20 configured, the shared power source 14 may output power, as depicted by block 74. For example, the shared power source 14 may output power to an output stud that is electrically coupled to a connector 32 and 48 on the power supply 12. Therefore a device coupled to the connector 32 and 48 may be powered accordingly.

Figure 4:
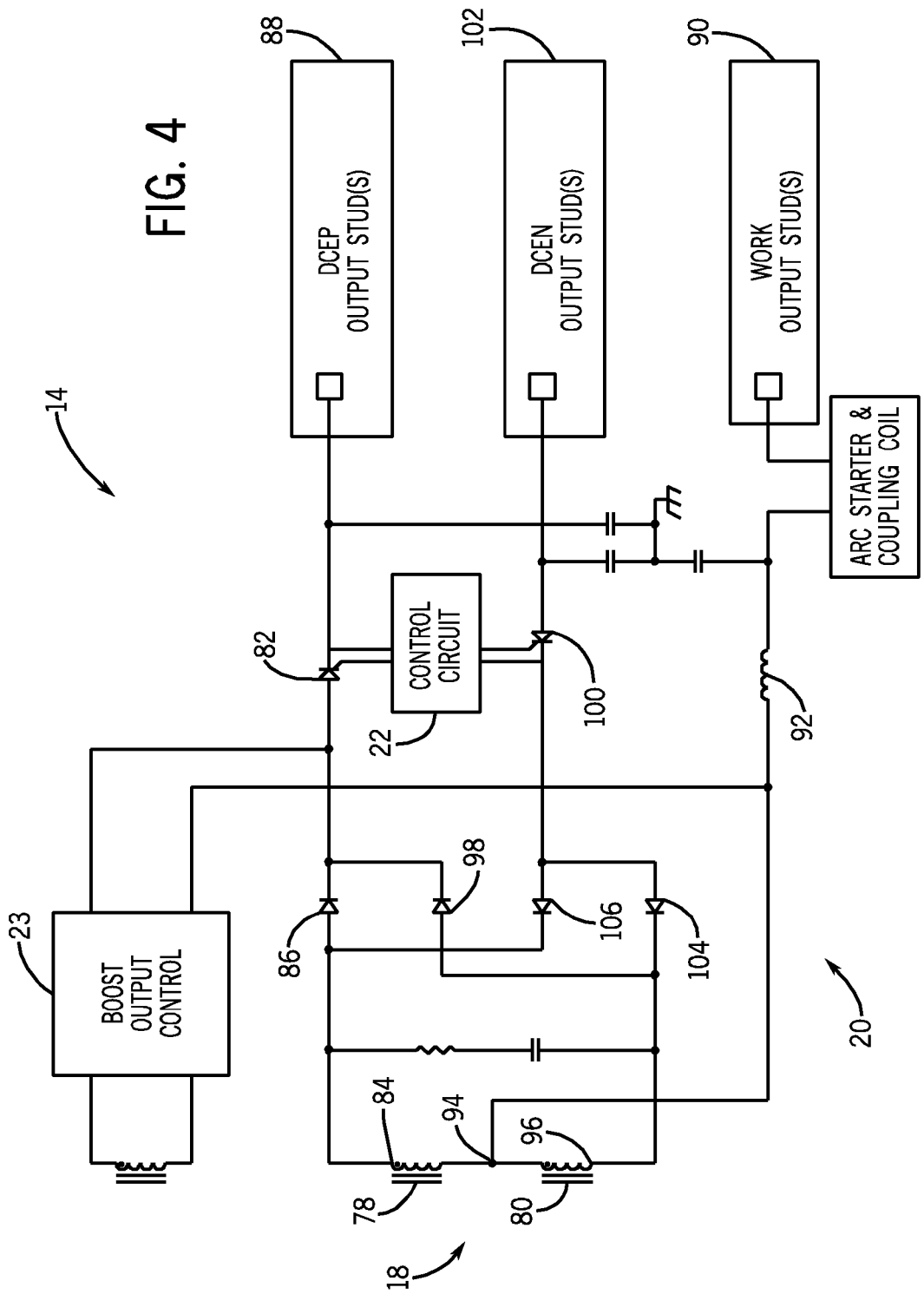
FIGS. 4-10 are schematic diagrams of alternate embodiments of the shared power source of FIG. 2 in accordance with embodiments of the present technique.

Turning now to FIG. 4, depicted is an embodiment of the shared power source 14 comprising an output configured to provide electronic polarity reversal. The shared power source 14 includes power circuitry 20 and a control circuit 22 configured to route power from the transformer 18 in accordance with a selected welding process. In one embodiment, the shared welding power source 14 may be configured to operate in a DCEP mode. For example, a high-frequency current is delivered to the torch 28 and 44 and the workpiece 36 and returned to the power source 14 based on the configuration of the transformer 18. In an embodiment that includes a center tapped transformer 18, the transformer 18 may include a first secondary winding 78 and a second secondary winding 80 configured to receive power from a primary winding electrically coupled to the external power source 16. In an embodiment in which the transformer 18 is configured to operate in a forward-biased mode, the control circuit 22 may enable a first switch 82 to enable current to flow across the first switch 82. Accordingly, a positive weld current flows from a first terminal 84 through a first rectifier 86, the first switch 82 and the first DCEP output stud 88. As discussed previously, the first DCEP output stud 88 may be electrically coupled to a welding device, such as a MIG gun 44, configured to operate in DCEP mode. Welding current is returned to the power source 14 via the work output stud 90. As discussed previously, the work output stud 90 may be electrically coupled to a workpiece 36 via a connector 42 and 58, cable 40 and 56 and work clamp 38 and 54. Accordingly, returning welding current flows through the work output stud 90, the output inductor 92 and the center-tap connection 94 of the transformer 18.

In an embodiment configured to output power to device connected to a DCEP output and including the transformer 18 configured to operate in a reverse-biased mode, current may flow in an alternate path. For example, similar to the forward-biased DCEP mode, the controller circuit 22 may enable a first switch 82 to allow current to flow across the first switch 82. Accordingly, a positive weld current may flow from a second terminal 96 through a second rectifier 98, the first switch 82 and a first DCEP output stud 88. Welding current is returned to the power source 14 via the work output stud 90. Accordingly, welding current flows through the work output stud 90, the output inductor 92 and the center-tap connection 94 of the transformer 18.

The welding circuit depicted in FIG. 4 may also include a configuration to operate in a DCEN mode. In an embodiment configured to output power to a DCEN output and where the transformer 18 is configured to operate in a forward-biased mode, the controller circuit 22 may enable a second switch 100 to allow current to flow across the second switch 100. Accordingly, positive weld current flows from the center-tap connection 94 of the transformer 18, through the output inductor 92, and the work output stud 90. As discussed previously, the weld output stud 90 may be electrically coupled to a workpiece 36 via a connector 42, cable 40 and work clamp 38. Welding current is returned to the power source 14 via the DCEN output stud 102. As discussed previously, the second weld output stud 102 may be electrically coupled to a welding device, such as a TIG torch 28, configured to operate in DCEN mode. Accordingly, welding current flows through the first DCEN output stud 102, the second switch 100, a third rectifier 104 and second terminal 96 of the transformer 18.

In an embodiment, configured to output power to a DCEN output and where the transformer 18 is configured to operate in a reverse-biased mode, current may flow in an alternate path. For example, similar to the forward-bias DCEN mode, the controller circuit 22 may enable the second switch 100 to enable current to flow across the second switch 100. Accordingly, a positive weld current may flow from the center-tap 94, through the output inductor 92, and the work output stud 90.

Welding current is returned to the power source 14 via the first DCEN output stud 102, the second switch 100, a fourth rectifier 106 and the first terminal 84 of the transformer 18.

The topology depicted in FIG. 4 provides a DCEP and DCEN output on two separate outputs (DCEP output stud 88 and DCEN output stud 102). Thus, the shared power source 14 may support a DCEP device and a DCEN device simultaneously and may switch the output between the two devices without requiring a user to reconnect the devices and/or manually switch a control. As discussed below, the topology of the shared welding power source 14 depicted in FIG. 4 may be modified to support an infinite number of DCEP and DCEN devices.

Figure 5:
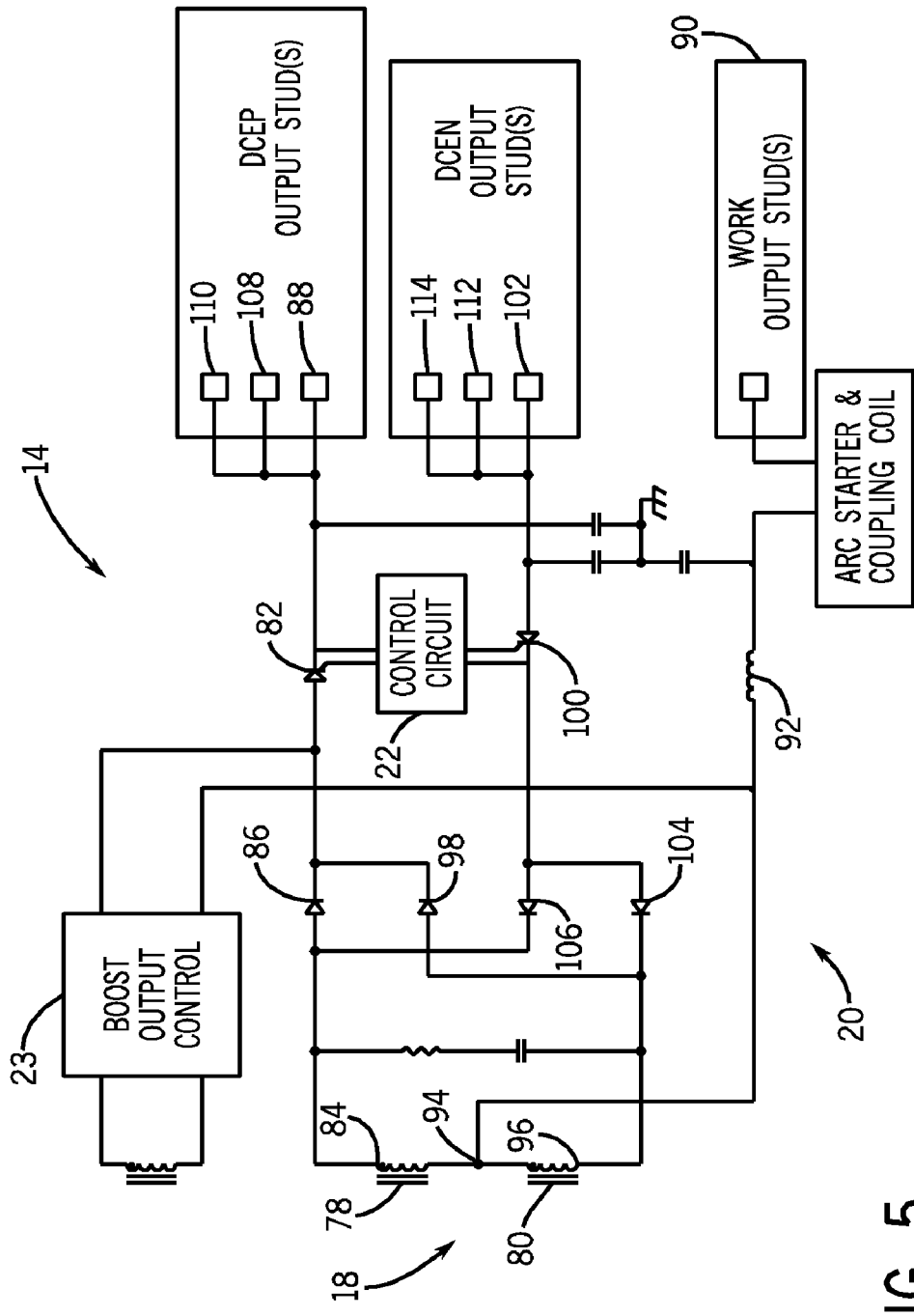

Turning now to FIG. 5, depicted is a shared welding power source 14 including an electronic polarity reversal power output that comprises three DCEP output studs 88, 108 and 110 and three DCEN output studs 102, 112 and 114. An embodiment includes a second DCEP output stud 108 and a third DCEP output stud 110 in parallel with the first DCEP output stud 88. In this configuration, multiple welding devices may be connected to DCEP outputs 88, 108 and 110 simultaneously. For example, current may be provided to three separate MIG guns 44 electrically coupled to the DCEP output studs 88, 108 and 110 and returned to the shared power source 14 via the workpiece 36 electrically coupled to the work output stud 90. Similarly, multiple devices may be coupled to the DCEN output studs 102, 112 and 114 simultaneously. For example, current may be supplied to the workpiece 36 electrically coupled to the work output stud 90 and returned to the shared power source 14 via one of three separate TIG torches 28 electrically coupled to the DCEN output studs 102, 112 and 114.

The topology depicted in FIG. 5 may be advantageous because an infinite number of DCEP output studs 88, 108 and 110 and DCEN output studs 102, 112 and 114 may be provided from the shared power source 14 that comprises two switches 82 and 100. Thus, the cost and complexity of the system may be minimized. However, in such a system, when one of the output studs 88, 102, 108, 110, 112 and 114 is "live" (i.e., has voltage potential), the other output studs may also remain "live." For example, if the first switch 82 is enabled, and current is provided to the DCEP output studs 88, 108 and 110, current may flow to a MIG gun 44 connected to one of the first DCEP output studs 88 and current potential may be provided at the second and third DCEP output studs 108 and 110 and/or any devices connected to them. Similarly, if the second switch 100 is closed, all of the DCEN output studs 102, 112 and 114 may be live at the same time.

Figure 6:
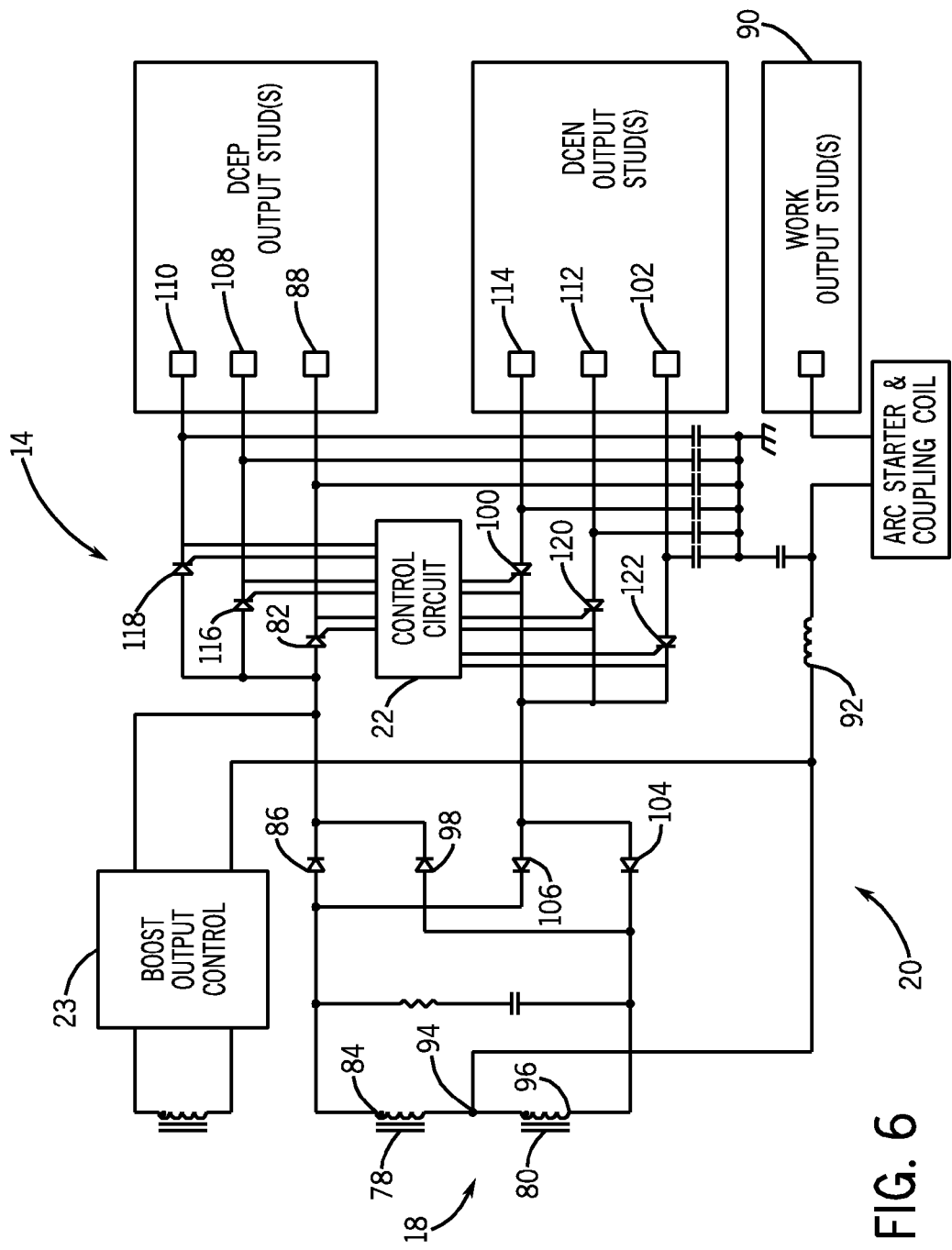

A topology of the shared power source 14 may include various other components (such as additional switches) to more efficiently route the power and limit the number of live output studs. Turning now to FIG. 6, depicted is a modified topology including additional switches to limit the number of live weld output studs. In an embodiment, the shared power circuit 14 may include power circuitry 20 that includes additional switches 116, 118, 120 and 122 configured to provide an open or closed circuit to the each of individual output studs. In an embodiment, the control circuit 22 may open or close the switches 82, 100, 116, 118, 120 and 122 to coordinate the power output to each respective output stud. For example, as depicted in FIG. 6, the first DCEP switch 82, the second DCEP switch 116 and the third DCEP switch 118 may be configured such that closing or opening the switches 100, 116 and 118 may complete or disconnect the current path to the first DCEP output stud 88, the second DCEP output stud 108 and the third DCEP output stud 110, respectively. Similarly, the first DCEN switch 100, the second DCEN switch 120 and the third DCEN switch 122 may be configured such that closing or opening the switches 100, 120 and 122 may complete or disconnect the current path to the first DCEN output stud 102, the second DCEN output stud 112 and the third DCEN output stud 114, respectively. Thus, the shared power source 14 may output a current via a single output stud 102, 112 and 114 without producing a current potential on any of the other output studs. For example, if the shared power source 14 operates in DCEP mode, the control circuit 22 may enable the first DCEP switch 82 to provide current to the first DCEP output stud 88 and disable the other switches 100, 116, 118, 120 and 122 to ensure the other output studs 102, 108, 110, 112 and 114 are not live. In other words, the control circuit 22 may only close the switches 82, 100, 116, 118, 120 and 122 that correspond to output studs configured to be live. Further, an embodiment may include any number of switches and output studs to enable connection to any number of welding devices (such as TIG torches 28 and MIG guns 44), cutting devices, and so forth. For example, the power circuitry 20 may include any number of output studs and a corresponding number of switches.

The control circuitry 20 depicted in FIG. 6 offers flexibility by allowing a user and/or the control circuit 22 to specify which output stud receives power. In an embodiment, the control circuit 20 may detect that a device is not connected to an output stud 88, 102, 108, 110, 112 and 114 and open a respective switch 82, 100, 116, 118, 120 and 122 to prevent a potential at the studs 88, 102, 108, 110, 112 and 114. For example, the system 10 may provide an electrical signal on an input of the control circuit 20 when a device is connected and the control circuit 22 may "unlock" the switch and enable the control circuit 20 to close the switch. Similarly, a signal may be input to the control circuit 20 to alert the control circuit 20 that an output stud does not have a device connected and, thus, the control circuit 22 may "lock" the respective switch open to prevent power from being delivered to the specific output stud.

Figure 7:
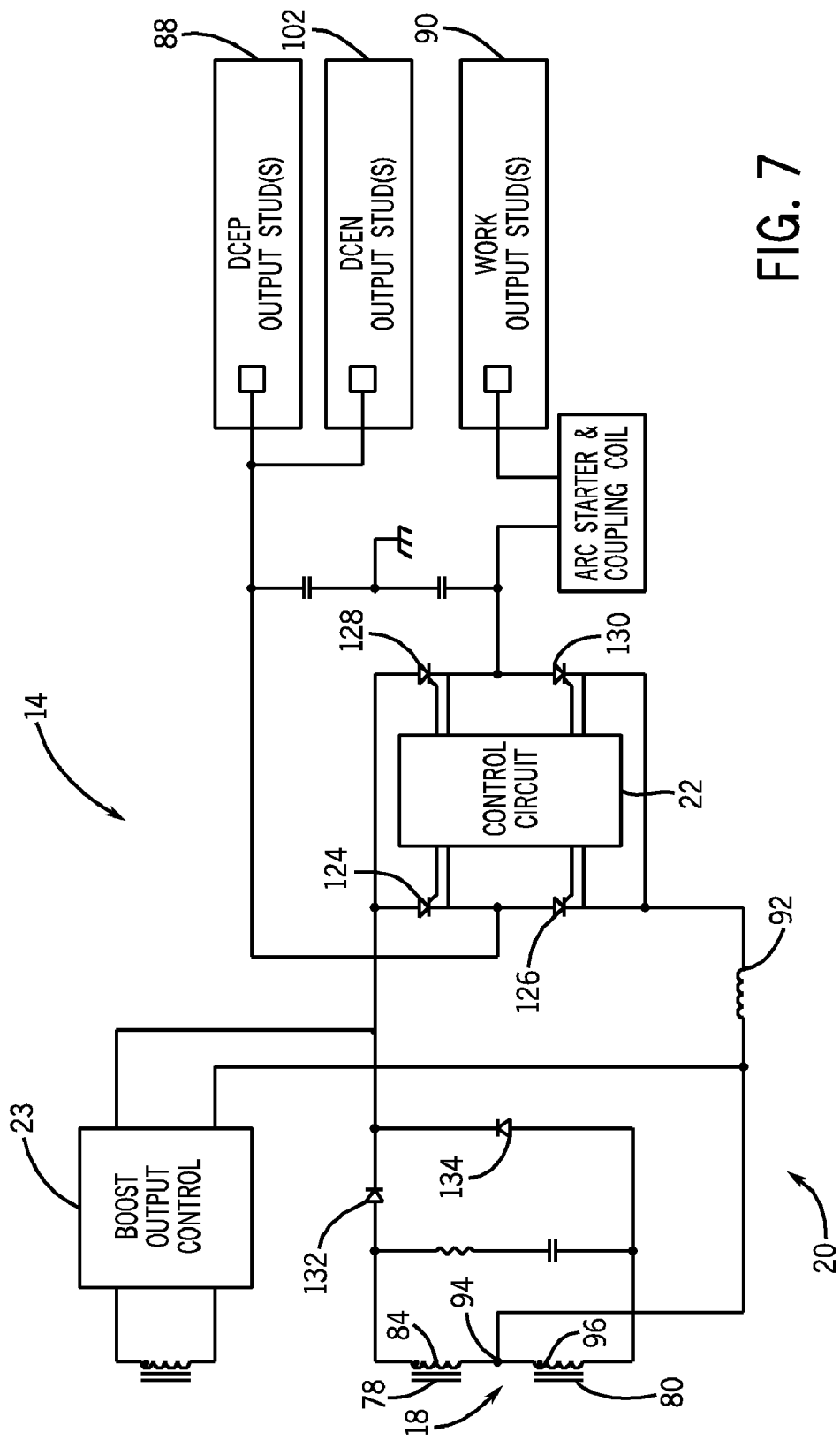

An alternative embodiment of the shared power source 14 may include a configuration of two output rectifiers and four switches, as compared to the four rectifiers included in the embodiments of FIG. 4-6. Turning now to FIG. 7, the shared power source 14 includes power circuitry 20 comprising two output rectifiers and four switches, as depicted. In an embodiment, the control circuit 22 is configured to control the states of the four switches 124, 126, 128 and 130 in a manner similar to those described with reference to FIGS. 4-6. For example, the control circuit 22 may receive a control signal indicative of which output stud requires power and the control circuit 22 may open or close the switches 124, 126, 128 and 130, accordingly. In an embodiment, where the shared power source 14 is configured to provide power to a device connected to the DCEP output stud and includes a center-tapped transformer 18 configured to operate in a forward-biased mode, the control circuit 22 may enable the first switch 124 and the fourth switch 130. Accordingly, a positive weld current flows from the first terminal 84 through a first rectifier 132, the first switch 124 and the DCEP output stud 88. Welding current is returned to the power source 14 via the work output stud 90. Accordingly, welding current flows through the fourth switch 130, the output inductor 92 and the center-tap connection 94.

In an embodiment where the shared power source 14 is configured to output power to the DCEP output stud 88 and the center-tapped transformer 18 is configured to operate in a reverse-biased mode, current may flow in an alternate path. For example, similar to the forward-biased DCEP mode, the controller circuit 22 may enable the first switch 124 and the forth switch 130 to enable current flow across the first switch 124 and the forth switch 130. Accordingly, a positive weld current may flow from the second terminal 96 through a second rectifier 134, the first switch 124 and the DCEP output stud 88. Welding current is returned to the shared power source 14 via the work output stud 90 and flows through the fourth switch 130, the output inductor 92 and the center-tap connection 94.

The shared power source 14 depicted in FIG. 7 may also be configured to provide power to the DCEN output 102. In an embodiment where the transformer 18 is configured to operate in a forward-biased mode, the controller circuit 22 may enable the second switch 126 and the third switch 128 to enable current flow across the second switch 126 and the third switch 128. Accordingly, a positive weld current may flow from the first terminal 84 of the transformer 18, through the third switch 128, and the work output stud 90. Welding current is returned to the power source 14 via the DCEN output stud 102 and flows through the second switch 126, output inductor 92 and the center-tap connection 94.

In an embodiment where the shared power source 14 is configured to provide power to the DCEN output 102 and where the center-tapped transformer 18 is configured to operate in a reverse-biased mode, current may flow in an alternate path. For example, similar to the forward-biased DCEN mode, the controller circuit 22 may enable the second switch 126 and the third switch 128 to enable current flow across the second switch 126 and the third switch 128. Accordingly, a positive weld current may flow from the second terminal 96, through the second rectifier 134, the third switch 128 and the work output stud 90. Welding current is returned to the shared power source 14 via the DCEN weld output stud 102 and flows through the second switch 126, the output inductor 92 and the center-tap connection 94 of the transformer 18.

Figure 8:
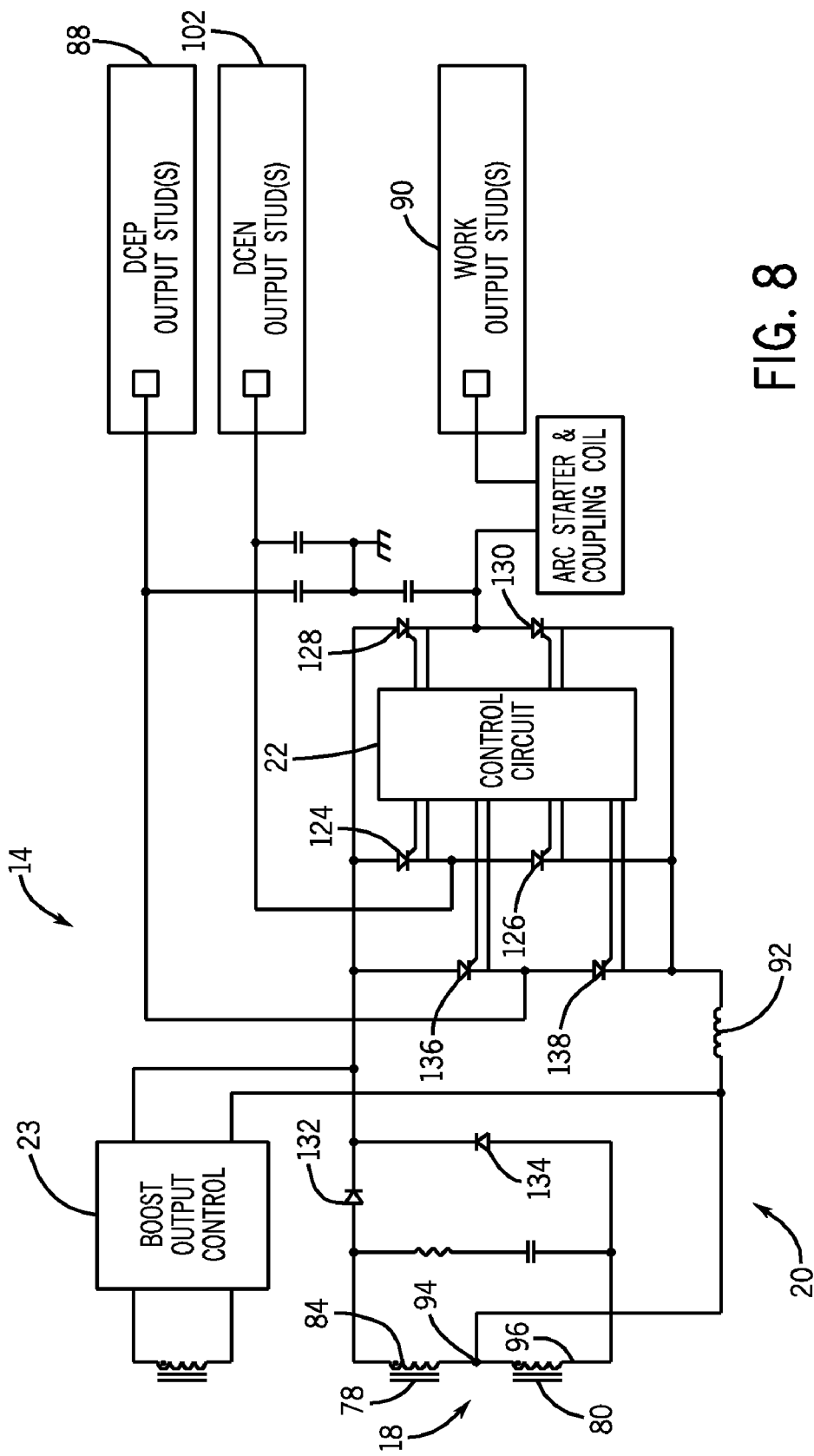

Although the embodiment depicted in FIG. 7 delivers power to the DCEP output stud 88 and the DCEN output stud 102 as demanded, such a configuration also makes both output studs 88 and 102 live at the same time. To resolve the issue, an embodiment may be configured to limit outputs to live output studs and non-live output studs. Turning now to FIG. 8, an embodiment is depicted that limits outputs on the DCEP output stud 88 and the DCEN output stud 102. For example, in an embodiment wherein the system is configured to output power to a DCEP output stud and where the transformer 18 is configured to operate in forward bias, the control circuit may enable the fifth switch 136 and the fourth switch 130. Accordingly, a positive weld current flows from the first terminal 84 through the first rectifier 132, the fifth switch 136 and the DCEP output stud 88. Welding current is returned to the power source 14 via the work output stud 90 and the welding current flows through the fourth switch 130, the output inductor 92 and the center-tap connection 94.

In an embodiment where the shared power source 14 is configured to provide power to the DCEP output stud 88 and the transformer 18 is configured to operate in a reverse-biased mode, current may flow in an alternate path. For example, similar to the forward-biased DCEP mode, the controller circuit 22 may enable the fifth switch 136 and the fourth switch 130 to enable current flow across the fifth switch 136 and the fourth switch 130. Accordingly, a positive weld current may flow from the second terminal 96 through the second rectifier 134, the fifth switch 136 and the DCEP output stud 88. Welding current is returned to the power source 14 via the work output stud 90 and flows through the fourth switch 130, the output inductor 92 and the center-tap connection 94.

In an embodiment where the shared power source 14 is configured to output power to the DCEN output stud 102, the control circuit 22 may enable and disable switches similar to the embodiment discussed with reference to FIG. 7.

The configuration depicted in FIG. 8 can be modified to include any number of output studs. For example, an additional set of switches may be provided similar to fifth switch 136 and sixth switch 138 illustrated in FIG. 8. Other embodiments may include the addition of output studs in parallel with the DCEP output stud 108 and/or the DCEN output studs 102. For example, the shared power source 14 may include additional DCEP output studs and DCEN output studs coupled in parallel to the DCEP output stud 108 and the DCEN output stud 102, respectively, in a manner similar to the configuration illustrated in FIGS. 5 and 6. An embodiment may include additional switches to limit outputs between the additional output studs. For example, additional switches can be added before each output stud, similar to switches 116, 118, 120 and 122 illustrated in FIG. 6, to further control the output current and limit the outputs on the live and non-live output studs.

Figure 9:
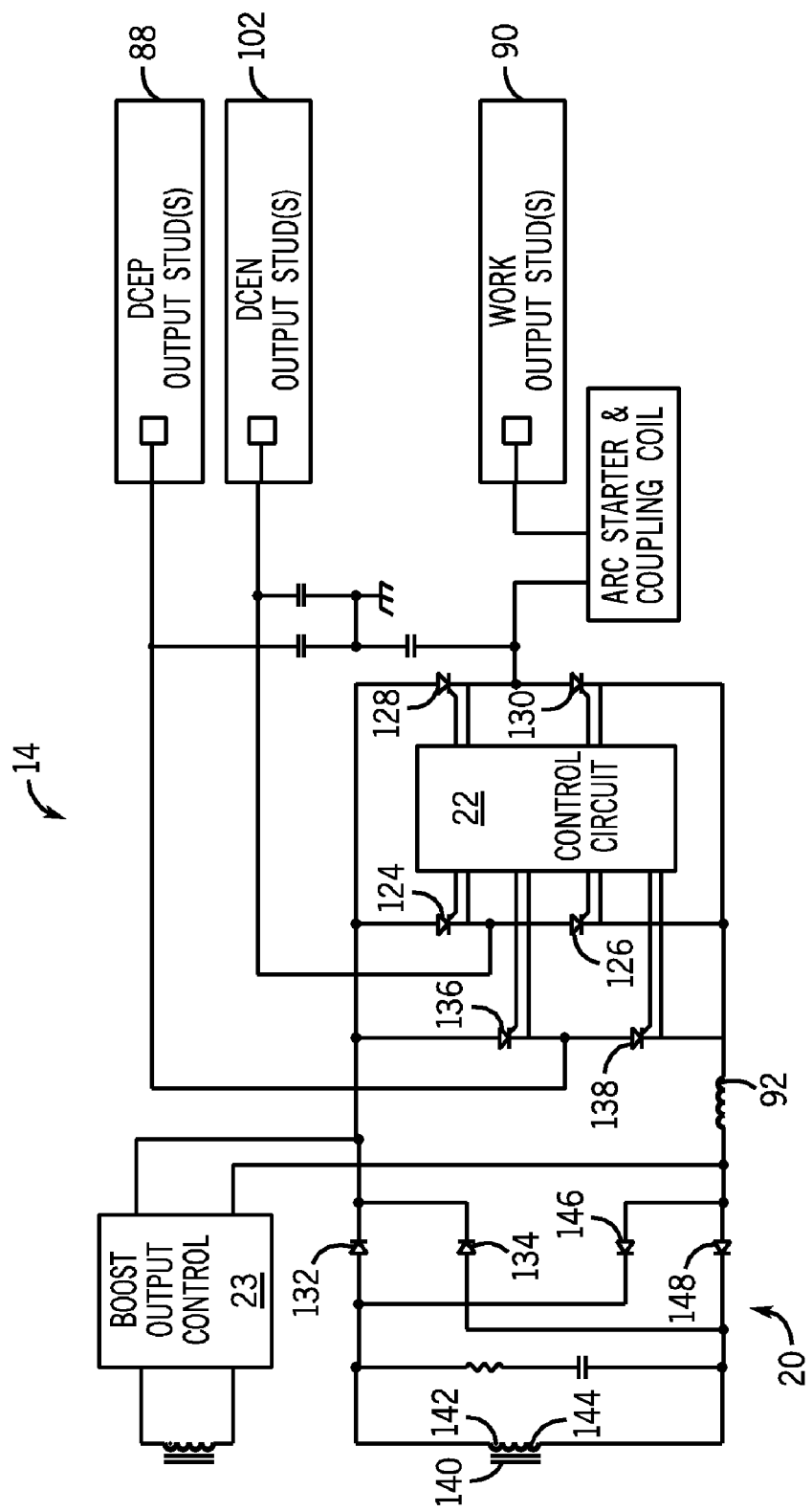
Figure 10:
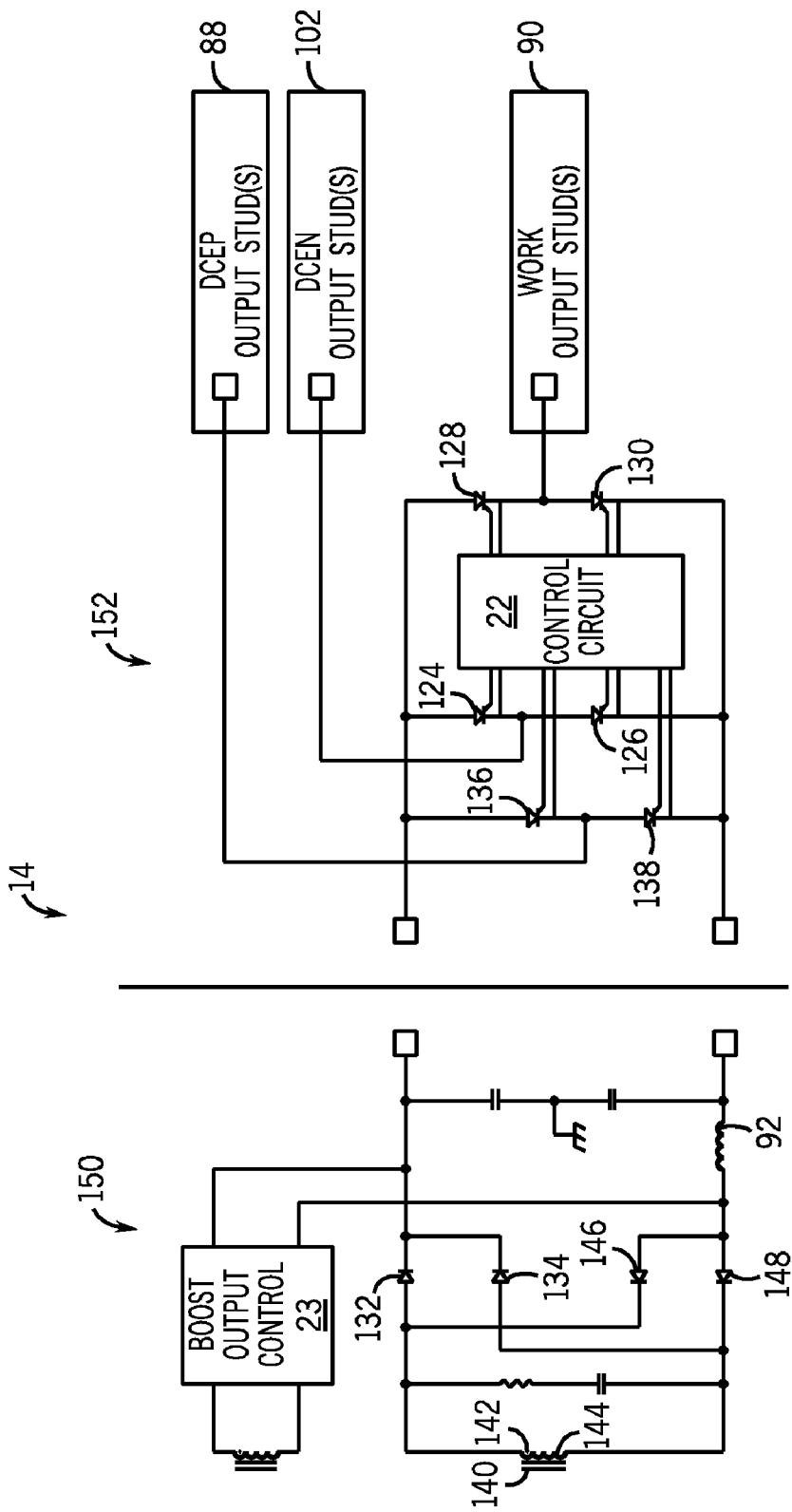

The shared power source 14 may include a transformer 18 with a single secondary winding. For example, as depicted in FIG. 9, the transformer 18 includes a single secondary winding 140 comprising a first terminal 142 and a second terminal 144. In an embodiment where the transformer 18 is configured to operate in a forward-biased mode, a positive weld current may flow from the first terminal 142 and through the first rectifier 132, and, then, may be routed via the switches 136 and 128 to the DCEP output stud 88 or the work output stud 90, based on the control circuit 22 setting for DCEP or DCEN output. Power may be returned from the work output stud 90 or the DCEN output stud 102 via the switches 130 and 126, and flow through the inductor 92, the fourth rectifier 148 and the second terminal 144.

In an embodiment where the transformer 18 is configured to operate in a reverse-biased mode, a weld current may flow from the second terminal 144, through the third rectifier 134 and routed via the switches 136 and 128 to the DCEP output stud 88 or the work output stud 90, based on the control circuit 22 setting for DCEP or DCEN output. Power may be returned from the work output stud 90 or the DCEN output stud 102 via the switches 130 and 126, and flow through the inductor 92, the second rectifier 146 and the first terminal 142. Accordingly, other embodiments may be configured to include a single secondary coil transformer 18. For example, the shared power source 14 depicted in FIG. 7 may be modified to include a single secondary coil transformer 18 and four rectifiers to route the output of the transformer 18 via the switch and the output studs 88, 90 and 102.

The flexibility of the shared power source 14 may be increased by dividing the shared power source 14 into a power source circuit and a remote polarity reversing circuit. For example, the shared power source 14 depicted in FIG. 10 includes a power source circuit 150 and a polarity reversing circuit 152 configured to operate remotely. In such a configuration, the shared power source 14 and/or the power supply 12 may include the power source circuit 150 and the polarity reversing circuit 152 as separate units. Thus, multiple configurations of the polarity reversing circuit 152 may be exchanged with the power source circuit 150. For example, the circuits depicted in FIGS. 7 and 8 may be divided in a similar manner to provide a remote polarity reversing circuit 152 coupled to a power source circuit 150 including a center-tapped transformer 18. In another embodiment, a power source circuit 150 including a transformer 18 comprising a single secondary winding 140 may be coupled to a polarity reversing circuit 152 including four switches 124, 126, 128 and 130 coupled to the control circuit 22. Other embodiments may include separating portions of the circuits depicted in FIG. 4-6 in a similar manner to comprise a remote polarity reversing circuit 142.

Previous discussions have referred to switches 82, 100, 116, 118, 120, 122, 124, 126, 128, 130, 136 and 138 that are provided to route power within the shared power source 14 and the respective power circuitry 20. The switches 82, 100, 116, 118, 120, 122, 124, 126, 128, 130, 136 and 138 are controllable via signal from a control circuit 22 based on a signal received and/or a mode established by the control circuit 22. The switches 82, 100, 116, 118, 120, 122, 124, 126, 128, 130, 136 and 138 may include devices such as a thyristor configured to conduct or not conduct current based on a signal (such as a signal from the control circuit 22) received at their gate. Embodiments may include other similar switching devices. For example, the switches 82, 100, 116, 118, 120, 122, 124, 126, 128, 130, 136 and 138 may include insulated gate bipolar transistors (IGBTs), metal-oxide-semiconductor field-effect transistors (MOSFETs) and/or electromechanical contactors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a multi-process power supply, comprising:
a transformer comprising a primary winding and a secondary winding, wherein the primary winding is configured to receive power from a power source and the secondary winding is configured to condition the power, and wherein the transformer is configured to operate in a forward-biased mode and a reverse-biased mode; and
power circuitry configured to receive the power from the secondary winding and to route the power to a plurality of outputs, wherein the power circuitry comprises a control circuit comprising switches configured to enable output of power at a first polarity via a first output of the plurality of outputs, a second polarity opposite from the first polarity via a second output of the plurality of outputs, or a combination thereof, based on a desired process selected from a plurality of different processes;
wherein, when the transformer operates in the forward-biased mode, the control circuit controls the switches to enable the power of the first polarity to be routed between the transformer and the first output via a first path through the multi-process power supply and controls the switches to enable the power of the second polarity to be routed between the transformer and the second output via a second path through the multi-process power supply, and wherein, when the transformer operates in the reverse-biased mode, the control circuit controls the switches to enable the power of the first polarity to be routed between the transformer and the first output via a third path through the multi-process power supply and controls the switches to enable the power of the second polarity to be routed between the transformer and the second output via a fourth path through the multi-process power supply.

2. The system of claim 1, wherein the multi-process power supply is configured to couple to multiple welding devices simultaneously.

3. The system of claim 1, wherein the plurality of different processes comprises a tungsten inert gas (TIG) welding process, a metal inert gas (MIG) welding process, a stick welding process, a plasma cutting process, or a combination thereof.

4. The system of claim 1, comprising a process selector configured to enable selection of the desired process.

5. The system of claim 1, wherein the first polarity is configured to provide a direct current electrode positive (DCEP) polarity.

6. The system of claim 1, wherein the second polarity is configured to provide a direct current electrode negative (DCEN) polarity.

7. The system of claim 1, wherein the multi-process power supply is configured to switch between outputting power at the first polarity or the second polarity without an operator mechanically actuating a switch configured to route power.

8. The system of claim 1, wherein the control circuit is responsive to an input control signal representative of the desired process.

9. The system of claim 8, wherein the input control signal comprises a signal generated when an operator initiates the desired process.

10. The system of claim 8, wherein the input control signal is generated via the activation of a switch located on torch device by the operator, and wherein the input control signal is transmitted from the torch device to the control circuit upon activation of the switch.

11. A system, comprising:
a transformer comprising a primary winding configured to receive an input power from an input power source and a secondary winding configured to condition the input power, wherein the transformer is configurable to operate in both a forward-biased mode and a reverse-biased mode;
a power circuit configured to receive the input power from the secondary winding and comprising switches configured to route the input power;
a first output configured to provide an output power comprising a positive polarity;
a second output configured to provide an output power comprising a negative polarity; and
a control circuit coupled to the power circuit and configured to provide a respective switch control signal to each of the switches such that power is output on the first or second output with a polarity controlled automatically in response to an input control signal representative of a welding process, a cutting process, or a combination thereof;
wherein positive polarity output power is routed between the secondary winding of the transformer and the first output differently depending upon whether the transformer is operating in the forward-biased or the reverse-biased mode, and wherein negative polarity output power is routed between the secondary winding of the transformer and the second output differently depending upon whether the transformer is operating in the forward-biased or the reverse-biased mode.

12. The system of claim 11, wherein the switches comprise a thyristor, an insulated gate bipolar transistor (IGBT), a metal-oxide-semiconductor field-effect transistors (MOSFET), an electro-mechanical contactor or a combination thereof.

13. The system of claim 11, wherein the positive polarity is configured to provide a direct current electrode positive (DCEP) polarity to a welding device and wherein the negative polarity is configured to provide a direct current electrode negative (DCEN) polarity to a welding device.

14. The system of claim 11, wherein the input control signal is indicative of a desired output polarity.

15. The system of claim 11, wherein the transformer comprises another secondary winding coupled to a boost output control circuit configured to provide additional power to the power circuit depending on power demand corresponding to devices connected to system.

16. The system of claim 11, wherein the first output, the second output, or both comprise multiple output terminals.

17. The system of claim 16, wherein the system is configured to limit the output to the multiple output terminals such that all of the multiple output terminals are not live simultaneously.

18. A power supply device comprising:
a transformer configured to operate in a forward-biased mode and a reverse biased mode and comprising a primary winding configured to receive AC power from an AC power source, first and second secondary windings configured to condition the AC power received at the primary winding, and a center-tap connection located between the first and second secondary windings;
power circuitry comprising:
a plurality of rectifiers comprising a first rectifier coupled to a first terminal of the first secondary winding, a second rectifier coupled to a second terminal of the second secondary winding, a third rectifier coupled to the second terminal of the second secondary winding, and a fourth rectifier coupled to the first terminal of the first secondary winding;
a plurality of output studs comprising a positive polarity output stud, a negative polarity output stud, and a work output stud; and
control circuitry configured to control a first switch and a second switch to provide positive polarity power to the positive polarity output stud and to provide negative polarity power to the negative polarity output stud, wherein providing the positive and negative polarity power is depending upon a desired process selected from a plurality of different processes;
wherein the first switch is coupled to the first and second rectifiers and the second switch is coupled to the third and fourth rectifiers.

19. The power supply device of claim 18, wherein:
when the transformer is operating in the forward-biased mode, positive polarity power is provided from the transformer to the positive polarity output stud via a circuit path comprising the first rectifier and the first switch, and returned through the work output stud to the center-tap connection; and
when the transformer is operating in the reverse-biased mode, positive polarity power is provided from the transformer to the positive polarity output stud via a circuit path comprising the second rectifier and the first switch, and returned through the work output stud to the center-tap connection.

20. The power supply device of claim 18, wherein:
when the transformer is operating in the forward-biased mode, negative polarity power is provided from the transformer to the negative polarity output stud via a circuit path comprising the center-tap connection and the work output stud, and returned through the negative polarity output stud, the second switch, and the third rectifier to the second secondary winding; and
when the transformer is operating in the reverse-biased mode, negative polarity power is provided from the transformer to the negative polarity output stud via a circuit path comprising the center-tap connection and the work output stud, and returned through the negative polarity output stud, the second switch, and the fourth rectifier to the first secondary winding.

21. The power supply of claim 18, wherein the first and second rectifiers are arranged in parallel with one another, and wherein the third and fourth rectifiers are arranged in parallel with one another.

* * * * *